April 30, 1940.  J. DICHTER  2,199,332

METHOD AND MACHINE FOR FORMING AMPOULES

Filed July 3, 1936  3 Sheets-Sheet 2

INVENTOR.
JAKOB DICHTER

BY

ATTORNEY.

April 30, 1940. J. DICHTER 2,199,332
METHOD AND MACHINE FOR FORMING AMPOULES
Filed July 3, 1936 3 Sheets-Sheet 3

INVENTOR.
JAKOB DICHTER
BY
ATTORNEY.

Patented Apr. 30, 1940

2,199,332

UNITED STATES PATENT OFFICE 2,199,332

METHOD AND MACHINE FOR FORMING AMPOULES

Jakob Dichter, Berlin-Schoneberg, Germany

Application July 3, 1936, Serial No. 88,817
In Germany July 5, 1935

6 Claims. (Cl. 49—7)

This invention relates to a method and an apparatus for the forming of ampoules or like glass bodies.

The invention contemplates heating a glass tube from which the ampoule is to be formed and then so regulating movement of the portions of the glass tube on opposite sides of the heated portion thereof that the diameter of the stem of the ampoule being formed will be accurately controlled as will also the shape of the ampoule shoulders.

The invention contemplates the provision further of a method and machine whereby shoulders of a desired wall thickness may be formed on the ampoule and whereby, as desired, the shoulders may be formed either perfectly conical or sharply constricted.

Numerous other objects and advantages of this invention will become more apparent as the following description proceeds particularly when reference is had to the accompanying drawings wherein Fig. 1 is a fragmentary vertical sectional view through a machine constructed in accordance with the teachings of this invention;

Fig. 4 is a diagrammatic plan view of the cam forming a part of the machine;

Fig. 6 is an elevational view of one type of ampoule which may be formed; and

Fig. 7 is an elevational view of a slightly modified form of ampoule.

Figure 1:
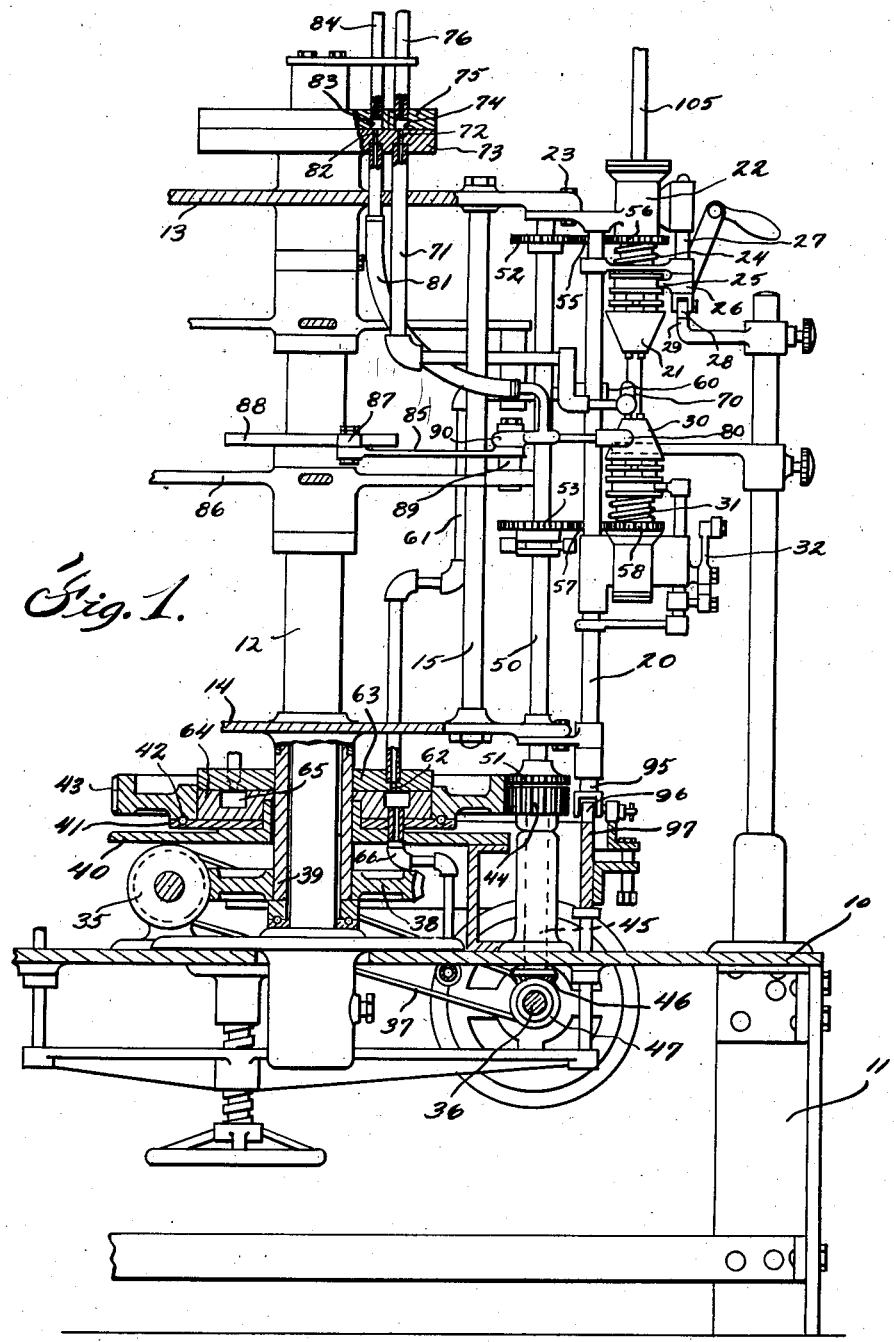
Figure 2:
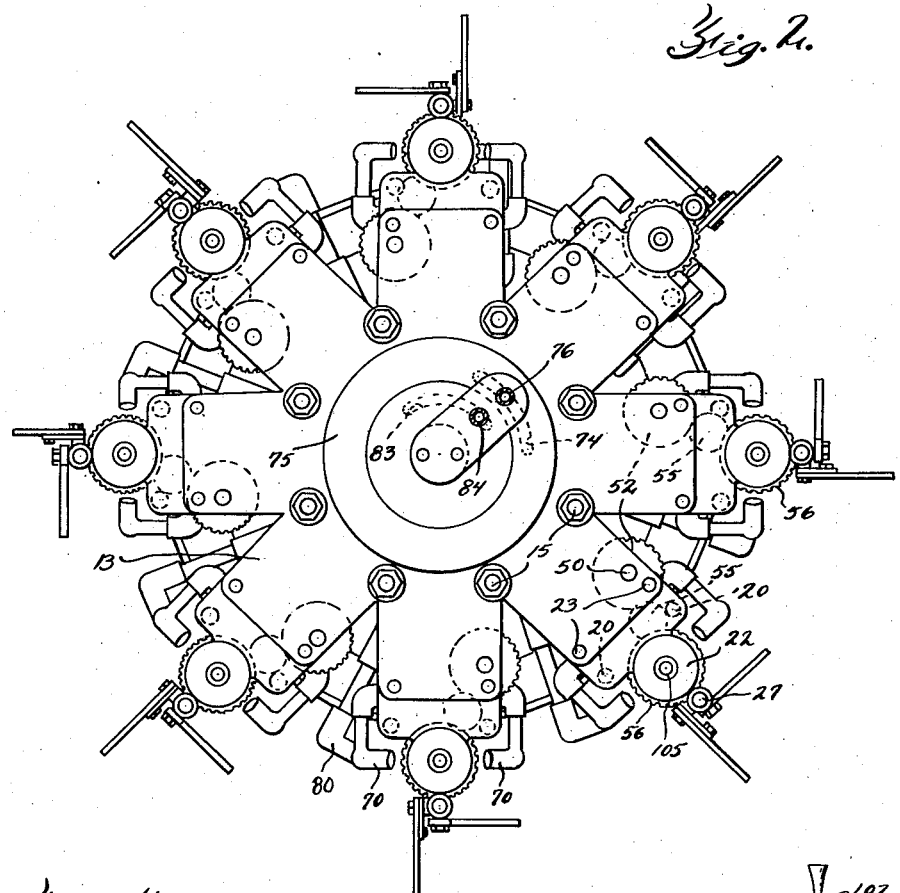
Fig. 2 is a semi-diagrammatic top plan view of the machine.

For the sake of illustration, the present invention has been disclosed as being incorporated in a machine of the type described and claimed in my Patent #1,962,985 issued June 12, 1934, and entitled, "Machine for the manufacture of ampullas and the like glass bodies". It is to be expressly understood however, that the inventive principles forming the subject matter of this application may be incorporated in machines other than that disclosed in my said patent.

In the drawings, the numeral 10 designates a base plate or platform suitably supported in spaced relation to the floor by legs or the like 11. Carried by the base plate and projecting vertically therefrom is a standard 12 on which upper and lower star plates or spiders 13 and 14 respectively, are journalled. These star plates are coupled together for rotation as a unit by tie rods 15 and these star plates carry suitable chucks for gripping the glass tube during the forming operations.

In the embodiment illustrated there are eight sets of chucks, it being understood that the chucks that are carried by or are associated with the upper plate 13 are in alignment with the corresponding chucks carried by the lower plate 14. For each pair of chucks there are provided two rods 20, these rods being arranged in spaced relation to each other and extending vertically between the upper and lower plates as clearly illustrated in Fig. 3 of the drawings.

The upper chucks which may be of any desired character, are designated by the reference character 21 and these chucks are journalled in bearings 22 which are rigidly secured to the upper plate 13 as at 23. The upper chucks are closed by springs 24 and are adapted to be opened by suitable means such for example, as the fingers 25 carried by collars 26, fixed to supporting rods 27 which are mounted for vertical sliding movement. The rods 27 carry at their lower ends rollers 28 adapted to be engaged by a fixedly mounted cam 29, upon rotation of the plate 13.

Alined with each upper chuck 21 is a lower chuck 30 and each lower chuck is adapted to be closed by a spring 31. The lower chucks are mounted for vertical sliding movement on the rods 20 and are adapted to be opened and closed against the force of the springs 31 by suitable levers 32 arranged to be actuated by a fixedly mounted cam 33, the arrangement being such that during a portion of the rotation of the plates 13 and 14 about the center shaft 12, the lower chucks are opened.

For rotating the plates 13 and 14 there is provided a worm gear 35 driven from a main drive shaft 36 by a belt or the like 37. The worm gear drives a worm wheel 38 which is fixed to the sleeve 39 of the lower plate 14, this sleeve being suitably journalled on the shaft 12 as will be apparent.

For rotating the chucks 21 and 30 about their axes, the following structure is provided. Carried by the platform 10 and spaced above the same is a supporting plate 40 and carried by this plate is a ball race 41 for the bearings 42 which support a gear 43. This gear is driven from the shaft 36 by virtue of the pinion 44 mounted on the upper end of a shaft 45 this latter shaft being coupled to the shaft 36 by the bevel gears 46 and 47.

Associated with each pair of chucks is a vertical shaft 50 and each shaft carries at its lower end a gear 51 which meshes with and is driven by the gear 43. Each shaft 50 additionally carries gears 52 and 53. Each gear 52 drives through an intermediate gear 55 a gear 56 fixed to one of the upper chucks 21. Each gear 53 drives through an intermediate gear 57 a gear 58 fixed to a lower chuck 30. The gears 53 are keyed to their respective shafts 50 for movement longitudinally thereof upon vertical movement of the lower chucks 30.

Associated with each pair of chucks is a burner 60, and for supplying fuel such as gas or gas and air to these burners each burner is provided with a supply pipe 61, the opposite end of which communicates with an opening 62 formed in a plate 63 mounted for rotation with the lower plate 14. It will be understood that an annular series of openings 62 are provided in the plate 63 and that the pipes 61 and the plate 63 rotate with the plates 13 and 14 and thus about the shaft 12 with the chucks.

Carried by the plate 40 and thus fixed against rotation is a disk 64 provided with a channel 65 with which the ports 62 register. Fuel is supplied to the channel 65 by means of a supply pipe 66 with the result that as the ports 62 register with channel 65 fuel is supplied to the burners. The channel 65 extends only partly around the shaft 12 with the result that each burner 60 is supplied with fuel during a predetermined portion only of its travel around shaft 12.

Additionally, associated with each pair of chucks are burners 70 likewise adapted to be ignited during a portion of the movement of the chucks about the shaft 12. These burners are adapted for severing a formed ampoule from the remainder of the glass tube from which the ampoule is formed and are also so arranged as to form an ampoule bottom on the adjacent end of the glass tube. These burners are supplied with fuel by pipes 71, each pipe registering with a port 72 formed in a plate 73 and rotatable with the upper plate 13. The ports 72 are arranged to register during a portion of the rotation of plate 73 with a channel 74 formed in a disk 75 rigidly carried by the upper end of shaft or standard 12. A fuel such as gas or the like is supplied to channel 74 by a suitable supply pipe 76.

For the purpose of forming constrictions in the ampoules as will hereinafter be more fully described, the machine is provided with burners 80, there being one of these burners associated with each pair of chucks. Each burner 80 is provided with a supply pipe 81 and each supply pipe communicates with a port 82 formed in the disk-like plate 73. The ports 82 are arranged to communicate during a portion of the rotation of the plate 73 with a channel 83 formed in the stationary disk 75, fuel being supplied to this channel by means of supply pipe 84.

The burners 80 are moved toward and away from the ampoules being formed by means of levers 85 carried by a plate 86, which is fixed for rotation with the plates 13 and 14. Each lever 85 carries at its one end a roller 87 which engages a stationary cam 88. Each lever 85 is pivotally supported as at 89 on the plate 86 and supports its respective burner 80 by an arm 90.

For the purpose of raising the lower chucks 30 there is associated with each lower chuck an arm 95 the lower end of which carries a roller 96. This rod is mounted for vertical sliding movement and its upper end is arranged to engage the chuck body to raise the same. A cam 97 surrounds the standard 12 and the rollers 96 ride on this cam as clearly illustrated in Fig. 3 of the drawings.

The machine as thus far described is identical with that disclosed in my Patent #1,962,985. The machine is adapted for the formation of ampoules of various shapes, one of which is shown in Fig. 6 of the drawings. As illustrated, this ampoule comprises a body 100, a constriction 101, and an end portion 102 of reduced cross sectional area.

Figure 3:
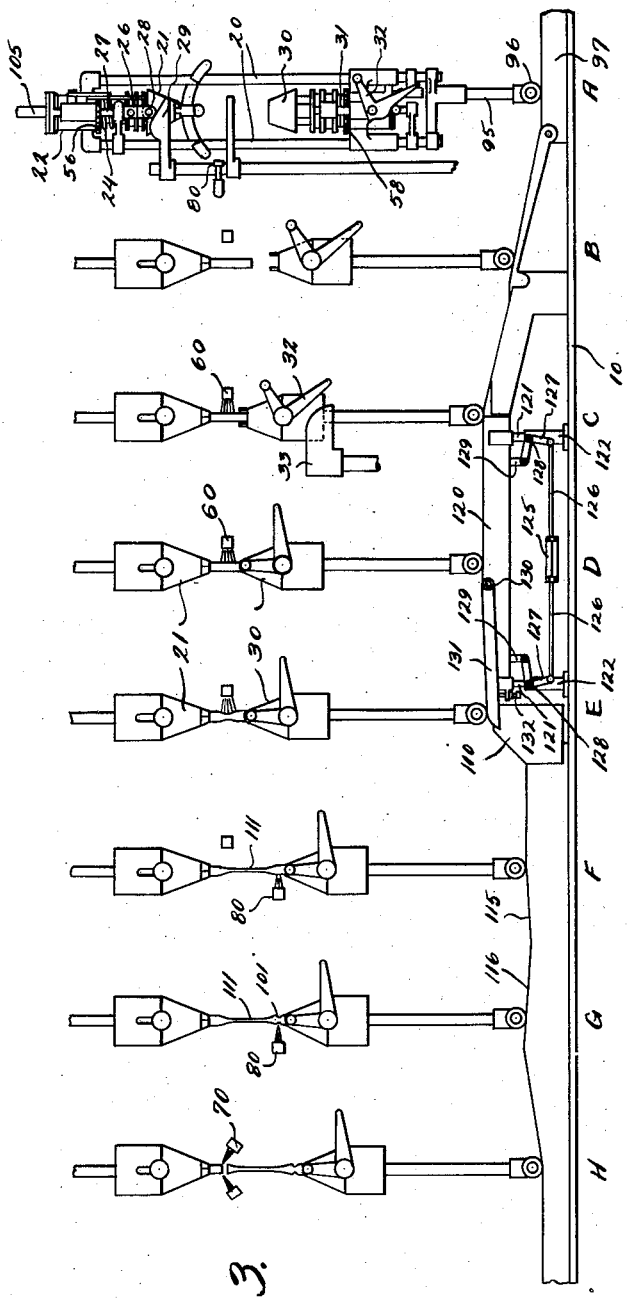
Fig. 3 is a diagrammatic view showing the several steps in the process.

In operation, a length of glass tubing designated by the numeral 105, is placed in each upper chuck and rotation of the plates 13 and 14 and the associated structure is then effected. The first station is illustrated at the right of Fig. 3 and is designated by the reference A. At this station the upper chuck is opened by the cam 29 permitting the glass rod to drop until its lower end engages a support 106.

Rotation of the plates 13 and 14 causes the chucks to move to the left as viewed in Fig. 3 and during their movement from stations A to B, the upper chuck is permitted to close thus grasping the length of tube 105. It will be noted at station B that the lower chuck is being moved upwardly by the incline of the cam 97, the arrangement being such that at position C the lower chuck has moved upwardly sufficiently to embrace the free end of the glass tube at which time the lower chuck is permitted to close by the cam 33. During its travel from station C to station E, the glass tube is heated by the burners 60, it being understood that during this travel the port 62 of the burner associated with the chuck the operation of which is being discussed, communicates with the channel 65 so that burner 60 is supplied with fuel. At station E the cam 97 is provided with an abrupt drop 110 whereby the lower chuck is permitted to move downwardly by the force of gravity to form the elongated portion 111 of reduced cross sectional area in the tube.

During further movement of the chucks toward the left as viewed in Fig. 3, the glass tubes are heated by the burners 80 and, if desired, there may be effected a further slight drawing apart of the glass material softened by the burners 80, this being accomplished by a further slight downward slope 115 of the cam 97. The lower chuck may then be moved slightly upwardly by the incline 116 with the result that the constriction 101 will be formed in the ampoule.

The burners 70 are then ignited and the ampoules severed from the remainder of the glass tube as diagrammatically illustrated at station H. It is to be understood that each upper chuck carries a length of glass tubing and that the above described operations are successively performed on each length of glass tubing so that the operation is continuous, there being eight ampoules of the character shown, for example, in Fig. 6 formed during each complete rotation of the plates 13 and 14.

As previously mentioned, the machine as thus far described, is identical with that disclosed in my Patent #1,962,985. While this machine efficiently produces ampoules on a commercial scale, it has several disadvantages which the present invention proposes to eliminate.

In the patented machine, the shape of the ampoule stem as well as the diameter thereof, could be regulated only by changing the length of the drawing operation or by a very accurately controlled heating of the portion which is constricted or by utilizing a burner having a definite shape. For example, on a comparatively wide tube difficulty was encountered in producing a small stem for the reason that only a small quantity of glass was available and this had to be heated so strongly that the stem frequently collapsed.

Additionally, it will be noted that in the patented machine the chucks are superposed so that the glass tube is supported with its longitudinal axis vertically disposed. Because of this, as the glass became softened by virtue of the heating thereof, a flow of glass downwardly resulted causing the bottom shoulder of the ampoule to be relatively thick and the upper end of the stem quite thin and therefore too fragile. The glass gathering at the bottom shoulder is particularly undesirable when it is desired to produce another constriction in the shoulder such, for example, as the constriction 101, while the flowing of the glass downwardly from the upper part of the stem caused the latter to continuously contract so that it frequently became considerably smaller at the center than at the part adjoining the bottom shoulder. This is a disadvantage since it is generally desirable that the stem be of substantially constant diameter.

If it is desired to form an ampoule such, for example, as that shown in Fig. 6, it is important that the lower shoulder or in other words the shape of the transition between the pulled stem and the ampoule body, be conical and that the wall of this portion be not too thick. On the other hand it is frequently desired to form an ampoule similar to that shown in Fig. 7 in which the shoulder is sharply defined. The present invention therefore provides a method and a machine whereby ampoules may be formed in which the stems will have a desired constant diameter or conical shape and in which the shoulder can be given a desired shape without the aid of tools.

In its broader aspects the method consists in gripping a glass tube at two spaced points along the length thereof, heating the tube between the portions thereof which are gripped and then varying the spaced relation of the gripped portions of the tube at the beginning of the softening of the heated part of the tube so that an ampoule of the desired shape will be formed.

If an ampoule such as disclosed in Fig. 6 is to be formed, the lower chuck is moved away from the upper chuck at the beginning of the softening of the heated portion of the tube, with the result that the shoulder part of the ampoule is brought out of the range of the heating burner and therefore assumes a desired conical shape. If, on the other hand, it is desired to form an ampoule of, for example, the character disclosed in Fig. 7, the lower chuck is moved upwardly toward the upper chuck at the beginning of the softening of the portion of the tube which is heated with the result that a sharply defined shoulder is obtained. It might be noted that by properly moving the lower chuck, the stem wall may be thinned or thickened as desired, and thus the diameter of the stem accurately controlled. Additionally, by the length of the movement of the lower chuck the diameter of the stem and the shape of the same as well as the length thereof is regulated to the greatest extent without greatly changing the heating burner.

Figure 5:
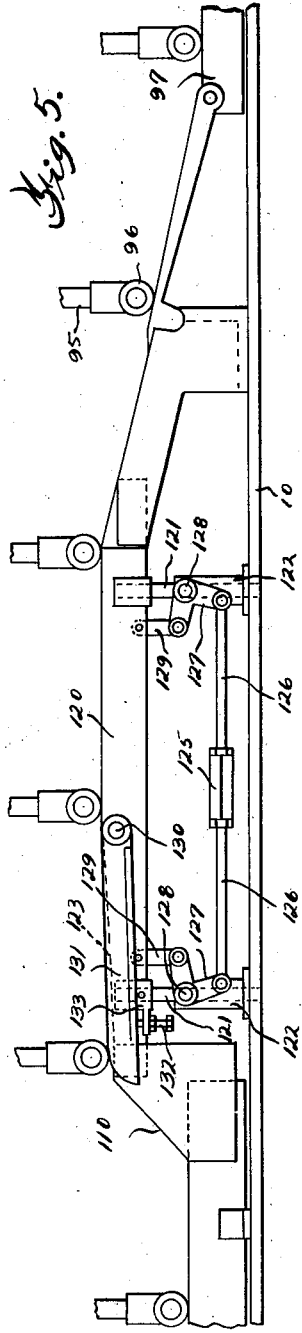
Fig. 5 is an enlarged elevational view of a part of the cam shown in Fig. 3.

In Figs. 3 to 5 inclusive, one form of mechanism for accomplishing the above desired result is disclosed in detail. As previously mentioned, the cam rail 97 controls the movement of the lower chuck 30. At station C the portion of the glass tube to be heated is subjected to the heat of the flame from burner 60. At station E the glass tube has been heated sufficiently to permit drawing of the stem of the ampoule by the downward movement of the lower chuck 30. Therefore, at a point between stations C and E, the heated portion of the glass tube begins to soften and it is at this point that the desired movement of the lower chuck should be effected.

Accordingly, there is substituted for the cam 97 between stations C and E, a rail or cam 120. This cam is supported by standards 121 which are mounted for vertical sliding movement in bearings 122 carried by the table or platform 10. It is to be noted that the left hand end of the cam or rail 120 is provided with a, slight downward incline as designated by the reference character 123.

It is contemplated that the cam 120 may be vertically adjusted so that it can be properly located with reference to the chucks 21 and 30 as determined by the length of the ampoule to be formed and the location of the burner 60. To effect this vertical adjustment there is provided a turn buckle 125 which through rods 126 actuate bell cranks 127 which are pivotally mounted on suitable supports as at 128 and which are connected by links 129 to the cam 130. It will be apparent that by rotating the turn buckle the rail or cam 120 may be raised or lowered to the determined desired position.

Pivotally mounted on the cam 120 as at 130 is a second rail or cam 131. The left hand end of this second cam is adapted to be raised or lowered by means of a set screw 132 which is rotated in a suitable support 133 and engages the lower edge of the cam. The beginning of cam 131 at point 130 corresponds to the most favorable softened condition of the heated glass mass, that is when the glass is beginning to soften and may therefore be pulled apart or pushed together.

In operation, it will be apparent that if the left hand end of cam 131 is lowered beneath the upper edge of cam 120, then as the glass tube begins to soften, the lower chuck 30 will be slightly lowered thus drawing the lower shoulder of the ampoule more out of range of the heating burner 60. This causes the lower shoulder to assume the conical shape and also results in the production of a narrower stem for the ampoule. By providing a conical shoulder on the ampoule it is possible to form a constriction such as illustrated at 101 in Fig. 6 of the drawings, while still permitting this constriction to have a round widened portion.

If, on the other hand, the left hand end of the rail 131 is lifted above the upper edge of the cam 120, the lower chuck is moved upwardly at the instant that the glass starts to soften with the result that the glass mass is pushed together thus producing a shoulder which is almost flat as illustrated in Fig. 7 of the drawings. Additionally, by pushing the glass together in this manner the stem of the ampoule may be formed perfectly cylindrical and substantially straight.

From the above it is believed that the manner in which applicant's method may be practised and the structure of a machine by which the method may be performed will be readily apparent. The invention provides for the softening of a glass tube to be shaped into an ampoule and provides for the pushing together or the drawing apart of the heated portion of the glass at the instant that softening of the glass begins with the result that the diameters of the ampoule stems as well as the shape of these stems and the shapes of the ampoule shoulders may be accurately controlled with the use of tools or the like.

While the invention has been illustrated as being incorporated in a machine of the character disclosed in applicant's Patent #1,962,985, it will be apparent that the invention may be incorporated in machines of other types. Additionally, while the method has been described as being adapted to be performed on a machine of the character disclosed, it will be apparent that in its broader aspects the method may be performed in any desired manner and on many different types of machines. It is therefore to be understood that the description is for the purposes of illustration only and is not definitive of the limits of the inventive idea, the right being reserved to make such changes in the steps of the method and the details of the machine as will fall within the purview of the attached claims.

What I claim as my invention is:

1. In the method of producing an ampoule, those steps which consist in gripping a piece of glass tubing at two spaced points along the length thereof, heating the tube between the portions thereof which are gripped, moving the gripped portions of the tube toward each other at the beginning of the softening of the heated portion of the tube, and after further softening of the heated portion of the tube drawing the gripped portions of the tube away from each other to form the ampoule stem.

2. In the method of producing an ampoule, those steps which consist in gripping a piece of glass tubing at two spaced points along the length thereof, heating the tube between the portions thereof which are gripped, moving the gripped portions of the tube a relatively small distance toward each other at the beginning of the softening of the heated portion of the tube, and after further softening of the heated portion of the tube moving the gripped portions of the tube further away from each other to form the ampoule stem.

3. In a machine of the class described, a pair of gripping devices for gripping a length of glass tubing, means for heating a portion of the length of tubing between the said gripping devices, means providing for movement of the gripping devices toward each other at the beginning of the softening of the heated portion of the glass tube, and means providing for movement of the gripping devices away from each other after the heated portion of the glass tube has become completely softened.

4. In a machine of the class described, a pair of gripping devices for engaging a length of glass tubing, means for heating a portion of the length of tubing between the said gripping devices, and means providing for a relatively small movement of one of the gripping devices toward the other at the beginning of the softening of the heated portion of the glass tubing to move a part of the heated portion of the glass tubing away from the heating means.

5. In a machine of the class described, a pair of vertically aligned chucks adapted to grip a length of glass tubing, means for moving said pair of chucks along a definite path, means for heating a portion of the length of tubing between the chucks during a part of the travel of the chucks along the path, means mounting the lower chuck for vertical movement, and a cam extending along the path of movement of the chucks for moving the lower chuck toward the upper chuck, said cam being provided with a plurality of portions each mounted for vertical adjustment independently of each other, one of said portions being adapted to further elevate the lower chuck after said lower chuck has been elevated by the other of said portions.

6. In a machine of the class described, a pair of vertically aligned chucks adapted to grip a length of glass tubing, means for moving said pair of chucks along a definite path, means for heating a portion of the length of tubing between the chucks during a part of the travel of the chucks along the path, means mounting the lower chuck for vertical movement, and a cam extending along the path of movement of the chucks for controlling the vertical movement of the lower chuck, one portion of said cam being vertically adjustable, another portion of said cam being pivoted at one end only to said one portion, and means for raising and lowering the free end of said pivotally mounted portion.

JAKOB DICHTER.